UNITED STATES PATENT OFFICE.

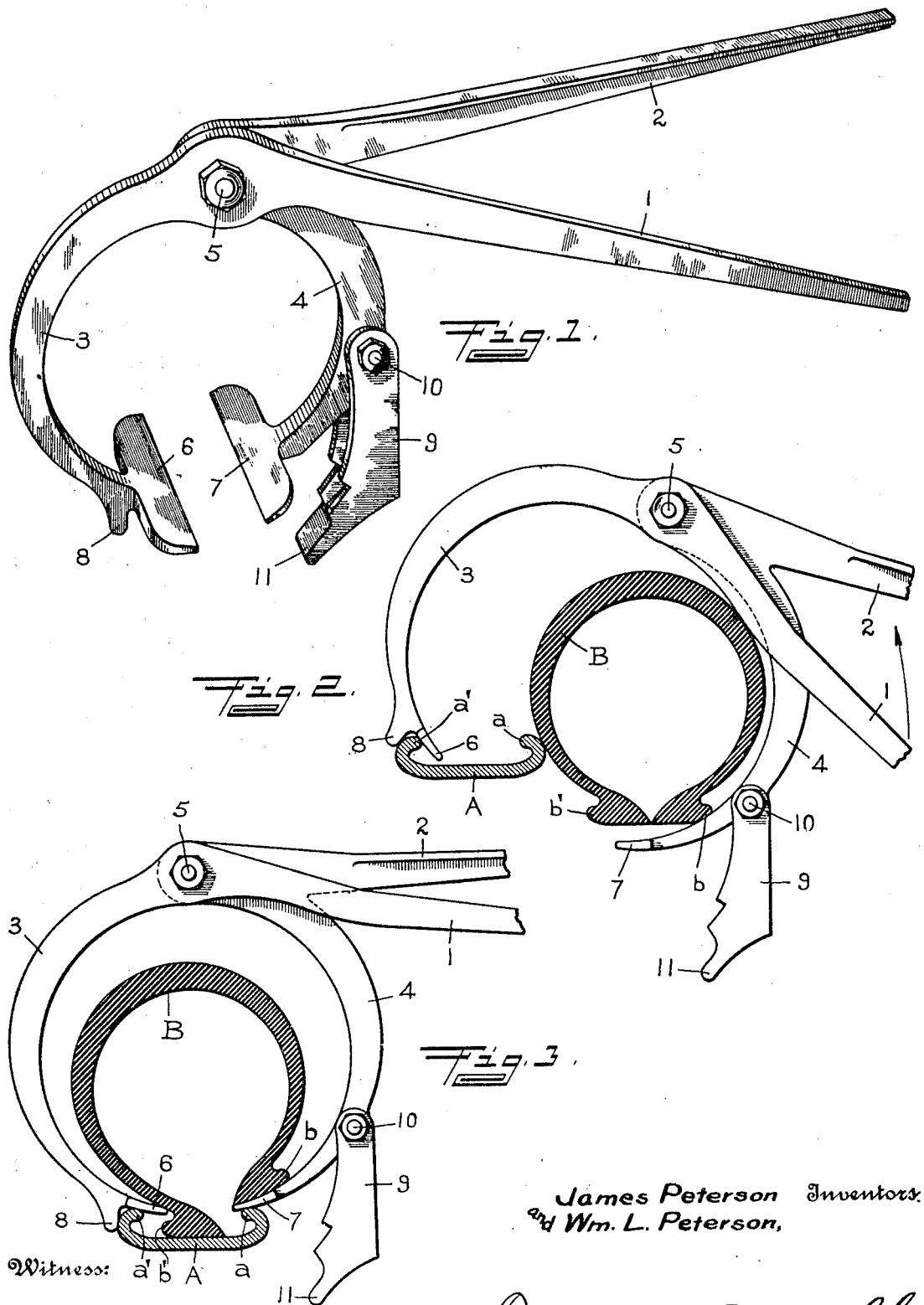

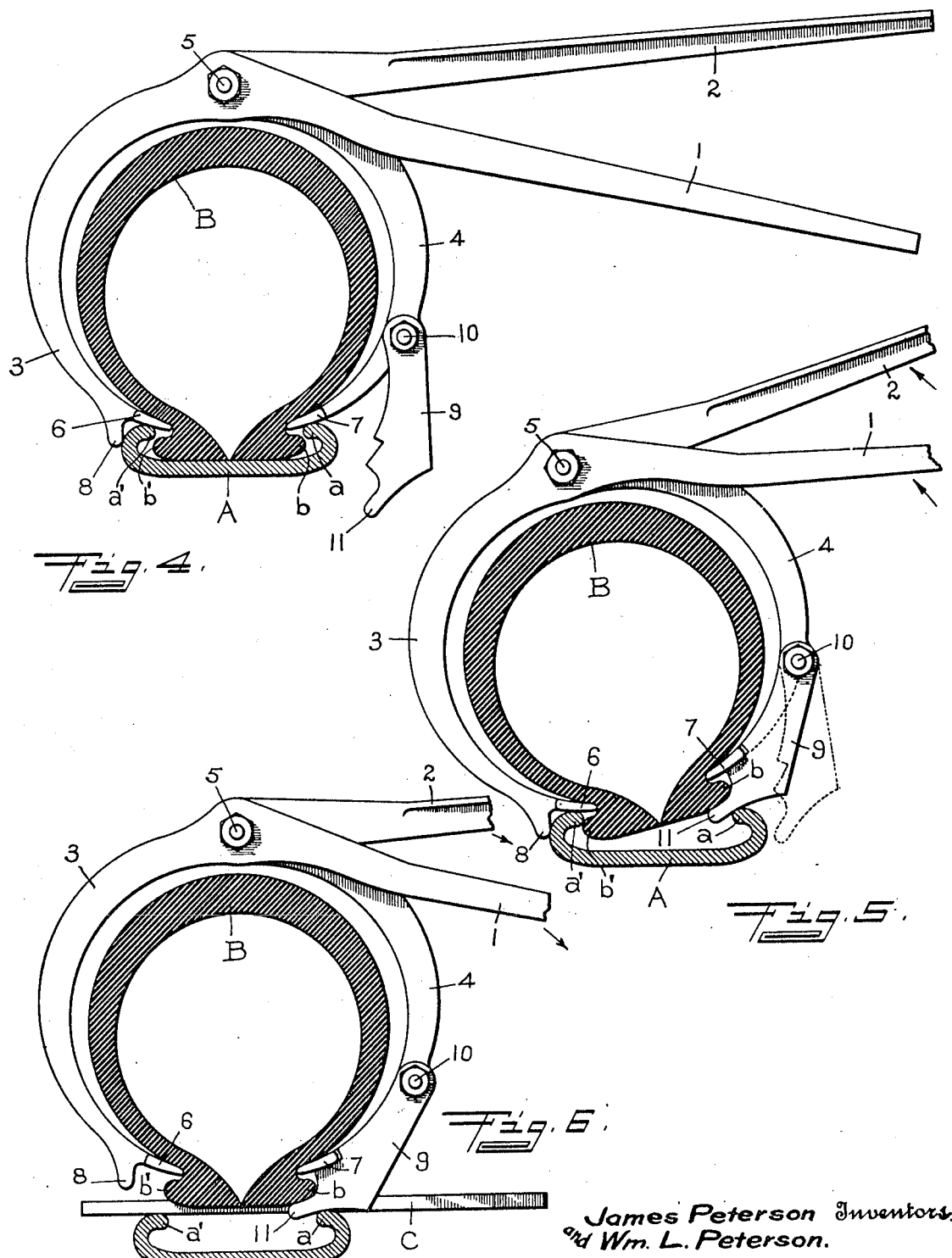

JAMES PETERSON AND WILLIAM L. PETERSON, OF AUBURN, NEBRASKA.

PNEUMATIC-TIRE TOOL.

1,317,143.   Specification of Letters Patent.   Patented Sept. 23, 1919.

Application filed November 13, 1915. Serial No. 61,405.

*To all whom it may concern:*

Be it known that we, JAMES PETERSON and WILLIAM L. PETERSON, citizens of the United States, residing at Auburn, in the county of Nemaha and State of Nebraska, have invented certain new and useful Improvements in Pneumatic-Tire Tools, of which the following is a specification.

Our invention relates to devices for removing the casings of pneumatic tires from the rims of vehicle wheels and for replacing the same upon the rims, and more particularly to devices of this kind for use with the well-known clencher type of tires. It is the object of our invention to provide a simple, inexpensive and convenient tool, having combined means by which the beads of heavy casings, as commonly used on motor-vehicles, may be loosened from the rim-flanges, and both sides or beads of the casing lifted above the level of the rim-flanges far enough to enable a bar to be inserted between the casing and rim, and by which the casing as a whole may be lifted over the rim-flange in placing the tire upon the wheel.

Constructions embodying our invention are illustrated in the accompanying drawings, in which Figure 1 is a perspective view of the tool, Fig. 2 is a transverse section of a tire and rim, showing the position of the tool at the beginning of the replacing operation, Fig. 3 is a similar view showing the positions of the parts near the completion of the tire-replacing operation, Fig. 4 is a similar view showing the positions of the parts when loosening the beads from the rim, Fig. 5 is a like view showing the parts in the second position assumed when the tire is being removed, and Fig. 6 is a view showing the parts in the third position assumed in removing the tire.

The tool provided by our invention is a tong-like device and consists principally of a pair of levers having handle-portions 1 and 2, and semicircular jaw-portions 3 and 4, the levers being pivotally connected to each other by a pin or bolt 5. The ends of the jaw-portions have flat transversely extending heads 6 and 7 integral therewith. The jaws 3 and 4 are so disposed with respect to the handles 1 and 2 that when the handles are substantially parallel the jaws inclose an approximately circular space tangent to the plane of the handles. As will appear more fully hereinafter, this arrangement of the jaws and handles enables the tool to be engaged with the tire of a motor-vehicle by extending the handles in beneath the fender over a wheel, so that the operations on the tire may be performed at the upper and most convenient side of the wheel, without being interfered with by the fender. For convenience of the description, the jaw 3 which is farthest from the grasped ends of the handles, will be designated as the distal jaw, and the jaw 4, or that nearest the hands of the operator, will be called the proximal jaw. On the outer or convex side and near the end of the distal jaw 3, adjacent to the head 6, there is a hook-shaped lug 8 integral with the jaw and shaped so as to conform approximately to the upper and outer surface of one of the flanges of an ordinary rim A such as is used with clencher-tires. To the proximal jaw 4 a foot-piece 9 is pivotally connected by means of a pin or rivet 10. The foot-piece is so formed that when swung in close to the jaw a portion thereof will engage the head 7, and a toe or extended portion 11 will pass beneath said head, being held in a spaced relation thereto.

In the use of the tool for removing a clencher tire from a rim, the first operation is that of loosening the beads $b$ and $b'$ of the tire B from the corresponding flanges $a$ and $a'$ of the rim A. In performing this operation the tire is first deflated, as usual, after which the handles 1 and 2 of the tongs are spread apart, the distal jaw 3 passed over the casing, and the handles moved toward each other so that the tire is substantially inclosed or embraced transversely by the jaws 3 and 4. Then, upon further closing of the jaws, the heads 6 and 7 press inwardly upon the casing just above the flanges $a-a'$ and the beads $b-b'$, whereby the beads are loosened from the flanges. Should the adherence of the bead $b$ to the flange $a$ be greater than that of the bead $b'$ to the flange $a'$, so that the latter are disengaged more easily than the former, the inward movement of the head 6 is limited by the lug 8, and, as a result of such limitation of movement, continued closing of the jaws results in both beads being properly loosened. Should the adherence of the bead $b$ and flange $a$ be less than that of the others, the bead $b'$ may be loosened by pulling on the tongs after the bead $b$ has been loosened. The loosening operation may be repeated at a plurality of places around the wheel, the latter being turned so that the part engaged is at a convenient position for the operation.

After the loosening of the beads, and with the tool in the position shown in Fig. 4, the handles 1 and 2 are both lifted, but without movement relative to each other, so that the entire tool moves as a lever fulcrumed on the flange $a'$ where the same is engaged by the head 6 and lug 8. By such movement the head 7 lifts the bead $b$ above the flange $a$, so that the foot-piece 9 may be swung in beneath said head 7 and rest upon the flange $a$ as shown in Fig. 5, thus retaining the bead $b$ in the raised position. The handles are then moved downwardly, the entire tool again moving as a lever, but being fulcrumed on the flange $a$ where the same is engaged by the foot-piece. This movement results in raising the bead $b'$ above the flange $a'$, so that a flat bar or lever C may passed through between the beads and the rim-flanges as shown in Fig. 6. After reaching the latter position the completion of the removing operation will be obvious, the tire being merely pulled off the rim, using the tongs as a means for grasping the casing, while the bar C prevents the beads from re-engaging the rim-flanges.

In replacing the tire-casing upon the rim, the greater part of the casing may be put into position quite easily, and, until the beads have been engaged with the rim-flanges nearly all the way around the rim, it is unnecessary to employ any special tool. For replacing the last remaining portions of the casing onto the rim, it is necessary to stretch the beads sufficiently to enable them to pass over the adjacent flange of the rim, and for this purpose the tongs are employed in the manner shown in Figs. 2 and 3. At the beginning of the operation the hook 8 on the distal jaw 3 is engaged with the distant rim-flange $a'$, while the jaw 4 is placed around the casing with the head 7 extending in beneath the beads, as shown in Fig. 2. At this position the handles 1 and 2 are quite widely separated, and by moving the handle 1 upwardly so that the same and the distal jaw 3 move as a lever fulcrumed upon the flange $a'$, meanwhile lifting the handle 2 but slightly so that the handles approach each other, the casing is lifted over the adjacent flange $a$. At the conclusion of the described movement, the bead $b'$ first slips off the head 7 onto the rim between the flanges, so that the parts are in the positions shown in Fig. 3, after which the operation is completed by pressing the handle 2 downward to move the bead $b$ farther inward, and then raising said handle 2 to withdraw the head 7 from beneath the bead and permit the latter to drop down onto the rim between the flanges thereof.

It will be obvious that, while the tool has been shown and described with reference to its use upon clencher tires only, it may be employed to advantage for similar operations upon other types of tires.

Now, having described my invention, what I claim and desire to secure by Letters Patent is:

A tire tool comprising a pair of tongs having C-shaped jaws whose concave surfaces face each other and an elongated-headed dog hinged to one of the jaws and formed at its head with a notch or offset to form an engaging surface for a wheel rim.

JAMES PETERSON.
W. L. PETERSON.